UNITED STATES PATENT OFFICE.

WILLIAM GILLETTE, OF HARTFORD, CONNECTICUT.

METHOD OF PRODUCING STAGE EFFECTS.

SPECIFICATION forming part of Letters Patent No. 389,294, dated September 11, 1888.

Application filed June 12, 1888. Serial No. 276,862. (No model.)

*To all whom it may concern:*

Be it known that I, WILLIAM GILLETTE, of Hartford, county of Hartford, and State of Connecticut, have invented a new and useful Improvement in Methods of Producing Stage Effects in Imitation of the Sounds Made by Horses' Feet, of which the following is a full, clear, and exact description.

My invention relates to a new and useful method of imitating the sound of a horse or horses approaching, departing, or passing at a gallop, trot, or any other desired gait, the same to be used in producing stage effects in theatrical or other performances or entertainments, exhibitions, &c.

My method, broadly and generally considered, consists in beating with clappers, that represent the hoofs of a horse, upon some material that serves to represent the road-bed over which the horse is supposed to be traveling.

In carrying out my method I am enabled to represent or imitate the sounds made by a horse's hoofs in stamping, pawing, or jumping about in a restive manner while the rider is mounting, and then starting off, first at a trot, then a gallop, and finally a run, or at any gait desired, in any order.

I am enabled to imitate, also, the sounds made by a horse's hoofs when traveling upon stone, brick, clay, gravel, greensward, or when crossing bridges, &c., there being practically no limit to the imitations, except as there is a limit to the natural sounds made by a horse's hoofs at different times and with different gaits and upon different roads.

The matter is so simple that an extended description is not necessary.

The clappers, hammers, or bodies which are to be struck upon the prepared bed or surface may be made of wood, hard rubber, bone, ivory, or any tough substance of a similar nature. The natural hoofs of a horse may be used, if not too dry. The clappers, for convenience, should be about the size and weight of a horse's hoof, so that they may be easily operated, as hereinafter described.

The under or striking surface should be practically flat, and should have secured to it the iron shoe of a horse or some other metallic piece to produce a sound similar to that made by a shod horse.

In case it is desired to imitate an unshod horse or to imitate a horse as passing over a surface where the ring of the metal of the shoe would not be heard, then the metal piece or shoe may be dispensed with and the clapper itself be beaten on the surface.

The shape of the clappers is preferably made to resemble a horse's hoof. On the under side it may be hollowed out, something as a horse's hoof is, and the metal surrounds this hollow. A cushion of any suitable material may, if desired, be inserted, to represent the frog of the hoof, though this is not necessary. The shape of the upper surface of the clappers is immaterial; but it is better to round them off somewhat, so that no corners or projections remain. The bed upon which the clapper is to be struck is arranged at any desired distance from where the audience is to be led to suppose the horse is traveling, and upon the floor, on a table, or any convenient spot for operating.

The construction of this prepared bed may be varied according as it is desired to represent the horse or other animal traveling over different materials, or on a bridge, or stone, &c.

A stone pavement or street would be represented simply by a piece of stone, marble, or slate. Cement may be used to represent a concrete pavement. Rubber or a soft material may be put under the artificial bed to prevent the wooden or soft sound of the floor or other wooden object from mingling with the sound produced by the clapper. Felt may be used for this cushion upon which the bed is placed. Cloth, felt, or rubber may also be put upon the upper surface of the stone or other material of the bed to vary the character of the sounds of the hoof. Asphalt might form the bed, if desired, either with or without the stone.

For convenience, earth, gravel, clay, bricks, or stone may be placed in a shallow box and packed down solidly, or the bed may be made up of different materials placed side by side. Hollow pieces of wood may be used either by themselves or arranged in the box with the other substances. There may be separate boxes for each separate material, or the character of the bed may vary in the same box.

It will be seen that it is not necessary that the bed upon which the clappers are to be struck should be of precisely the same material that the imitated sound is supposed to be produced upon. A sheet of rubber over a hard asphalt surface is an admirable form of bed for some purposes, and would serve in place of clay. The hoofs or clappers are usually furnished with straps running across their upper surface in the same way that brushes for horses are arranged, so that said clappers may be held for operation very much as a groom holds the brush while rubbing down a horse.

The clappers may be attached to the hands, arms, or feet of the operator, as convenience and experience may dictate. They may be arranged upon the ends of levers projecting over the prepared bed, and the other ends of the levers may be operated as are the levers of bells in ringing chimes; or a roller or cylinder may be arranged with pins to hit the ends of the levers as said cylinder rotates. The pins may be arranged in the same general way as are the pins upon the barrel of a hand-organ, and so that a mere laborer by turning the cylinder would produce in turn all the varying sounds required. The preferable way, however, would seem to be for a skilled imitator or artist, so to speak, to exercise his skill and judgment with the clappers manipulated by hand.

By means of the proper movement of the clappers on the bed and then the thrusting of them upon thin boards with great force the kicking of a horse or mule against the fence or dash-board of a vehicle may be readily imitated. Several clappers may be arranged upon two long pieces of board and each board be held by a strap in one hand; and the clappers may vary in size or shape or material, so that a single operator may with his hand imitate the sounds of a half-dozen or more of horses. Several operators could readily imitate the movement of a body of cavalry with horses taking different gaits.

The iron or shoe upon the clapper may be left loose, so as to give the sound of a horse traveling with a loosened shoe. One iron shoe and one simple wooden clapper may be used, and thus represent the sound of a horse that has lost a shoe. By varying the force of the stroke the sounds made by a lame horse may be imitated. The pawing and scraping of a restive horse may be imitated. By gradually increasing the force of the blows the sound of a horse approaching may be reproduced, and by giving them with gradually-diminishing force the sound of a horse departing imitated. There is, in fact, no practical limit to what a skilled operator may do in this line of work while following out my method.

I am aware that persons have sometimes stamped upon the floor of a theater behind the scenes to imitate the sound of a man approaching the door; but I am not aware that in any instance clappers to represent the hoofs of a horse have been operated upon a bed representing the surface on which the horse is supposed at the time to be.

The different sorts of clappers and apparatus for manipulating them may be as varied as the taste and judgment of the operator may dictate.

Having thus described my invention, what I desire to claim and secure by Letters Patent is—

The method of imitating for stage purposes the sound of a horse or horses or other animal or animals in traveling at different gaits, also stamping, pawing, or scraping, or, in general, any sound a horse or animal may make with its hoofs, by the beating of clappers with varying force and frequency upon a material or materials made to represent by its sound when struck the surface upon which at the time the horse is supposed to be, as herein described.

In testimony whereof I have hereunto set my hand this 9th day of June, A. D. 1888.

WILLIAM GILLETTE.

Witnesses:
  WM. E. HART,
  RICH. E. BURTON.